Figures 1, 2:
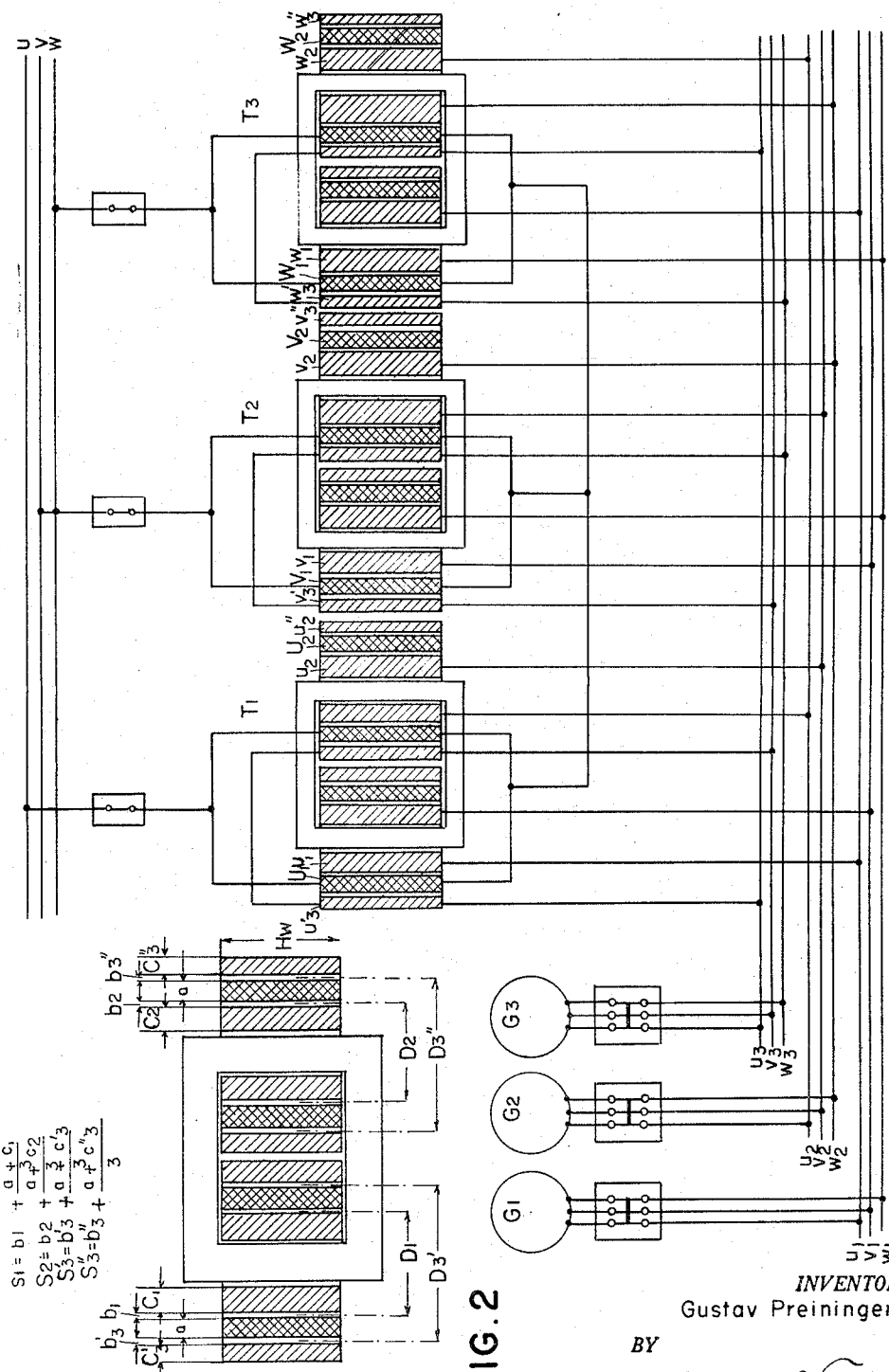

Nov. 29, 1960   G. PREININGER   2,962,600

TRANSFORMER BANK

Filed Oct. 17, 1958

$S_1 = b_1 + \dfrac{a + c_1}{3}$
$S_2 = b_2 + \dfrac{a + c_2}{3}$
$S_3 = b'_3 + \dfrac{a + c'_3}{3}$
$S''_3 = D_3 + \dfrac{a + c''_3}{3}$ INVENTOR.
Gustav Preininger
BY
Cecily L. Frey

United States Patent Office 2,962,600
Patented Nov. 29, 1960

2,962,600

TRANSFORMER BANK

Gustav Preininger, Graz-St. Peter, Austria, assignor to Elin Aktiengesellschaft für Elektrische Industrie, Vienna, Austria, a corporation of Austria Filed Oct. 17, 1958, Ser. No. 767,862

Claims priority, application Austria Oct. 21, 1957

3 Claims. (Cl. 307—83)

This invention relates to a bank of three single-phase transformers and more particularly to such a bank supplied by three three-phase generators.

In three-phase electric power transmission and distribution practice the increased powers and voltages entail the replacement of a three-phase transformer by three single-phase transformers. Only in doing so it is possible to design transformers which do not exceed the dimensions admissible for railway transportation. Especially three-phase transformers provided with voltage regulation under load would frequently exceed the admissible dimensions. Therefore, another motive for replacing a three-phase transformer with three single-phase transformers is the possibility of incorporating the load regulation in the single-phase units, which otherwise would have to be built as a separate regulating transformer in many cases. A further reason for the replacement is a more economical disposal of reserve units. Moreover, three single-phase transformers have become a necessity as the short-circuit powers of the supplied networks may reach values for which present-day circuit breakers have insufficient breaking capacity to control the short-circuit currents on the generator bus-bars. In such cases it is known to divide the primary winding into two or three sections, which have the same reactance in respect to the high voltage winding, but which have a large reactance between them, and to supply the two or three winding sections directly from the generator phases. In accordance with the usual practice the summation of the generator outputs is performed in two- or five-legged single-phase transformers depending on whether two or three generators feed the bank. Each leg of the two-legged cores and each of the three main legs of the five-legged cores, respectively, is supplied by a generator phase. The high voltage windings of the legs of a single-phase unit are connected in parallel.

This invention relates to a bank of three single-phase transformers which is fed directly by three three-phase generators. A suitable positioning and dimensioning of the primary and the secondary windings makes it possible to build the individual transformers of the bank with two-legged cores although the bank is supplied by three generators.

This invention corresponds in its object to the copending application Ser. No. 671,369, filed June 10, 1957, by Josef Kreuzer, now Patent Number 2,929,016, assigned to the assignee of the present application and constitutes an improvement over this application.

It is a disadvantage of the winding arrangements in accordance with the application Ser. No. 671,369 that a greatly increased leakage gap between the high voltage winding and the low voltage winding on the two legs is required to meet the demand for equal percentage short-circuit voltages each of the three primary windings, which is the fundamental condition for an equal load distribution. This disadvantage may be avoided by dividing of the high voltage winding and winding a small section of the high voltage winding immediately on the core. In practice, however, this measure is feasible only if the high voltage winding is solidly grounded.

It is the object of this invention to get equal percentage short-circuit voltages of the free primary windings also if the neutral point of the high voltage winding is not grounded, without the necessity to design the leakage gap beyond a measure required by electrical reasons. According to the present invention, each leg of the three single-phase transformers carries the following three windings: First, a low-voltage winding dimensioned for full phase power, the two windings on the two legs of the same transformer being supplied by the same phase of two different generators; second, a high-voltage winding, the two high-voltage windings on the two legs of the same transformer being connected in parallel; third a low-voltage winding, the low-voltage windings on the two legs of the same transformer being connected in parallel and supplied by the same phase of the third generator, these two third low-voltage windings being dimensioned for different powers, the sum of their powers equalling one full-phase power.

The invention will be described in the following description with reference to the drawing in which Fig. 1 is a schematic diagram showing the transformer bank and the supplying generators, and Fig. 2 is a schematic diagram showing one of the three single-phase transformers constituting the bank.

In Fig. 2, the dimensions determining the short circuit voltage are indicated.

The Fig. 1 of the drawing shows the three two-legged single-phase transformers $T_1$, $T_2$, $T_3$ connected to one transformer bank, the three three-phase generators $G_1$, $G_2$, $G_3$ supplying the same, the winding arrangement on each leg of the two-legged transformers $T_1$, $T_2$, $T_3$ and the manner of feeding the windings by the generator phases. As will be seen from the drawing, each leg carries a first primary winding (indicated by $u_1$, $u_2$, $v_1$, $v_2$, $w_1$, $w_2$, respectively, in conformity with number and phase of the feeding generator) immediately surrounding the core, a high voltage (secondary) winding (indicated by $U_1$, $U_2$, $V_1$, $V_2$, $W_1$, $W_2$) and a second primary winding (indicated by $u_3'$, $u_3''$, $v_3'$, $v_3''$, $w_3$, $w_3''$). The second primary windings of each two-legged core are connected in series. The primary windings $u_1$, $v_1$, $w_1$ are fed by generator $G_1$, the primary windings $u_2$, $v_2$, $w_2$ by generator $G_2$ and the primary windings $u_3'$, $u_3''$, $v_3'$, $v_3''$, $w_3'$, $w_3''$, series connected in pairs, by generator $G_3$. The secondary windings $U_1$, $U_2$, $V_1$, $V_2$, $W_1$, $W_2$ of each two-legged core are connected in parallel and feed in star connection the bus bars U, V, W.

To assure a uniform load distribution between the three generators, the impedance and, therefore the percentage short-circuit voltage, between each of the three low-voltage windings and the respective high-voltage winding must be equal.

As is usual in Europe the percentage short-circuit voltage for one leg of the transformer is computed according to the formula $$u_s \text{ percent} = 1.238 \frac{2f}{100} \frac{I^2 w^2}{N_w} \frac{sD}{H_w} k 10^{-6}$$

wherein $f$=frequency, $Iw$=number of ampere-turns of the primary winding on the leg, $N_w$=output of the winding for which the percentage short-circuit voltage is calculated, $s$=reduced width of the leakage gap, $D$=mean diameter of the leakage gap, $H_w$=height of the winding in the direction of the leakage gap and $k$=Rogowski-factor, a factor which accounts for the discrepancy between the actual length $H_w$ of the leakage gap and an equivalent leakage gap length, considering the magnetic resistance of the leakage path outside the gap of length $H_w$.

The term $$1.238\frac{2f}{100}\frac{k}{H_w}10^{-6}$$

is approximately equal to the three primary windings; it will be designated by $c$. Thus, we get for the percentage short-circuit voltage $$u_s \text{ percent} = c\frac{(Iw)^2}{N_w}sD$$

Considering that $D_1 = D_2 = D$ and in close approximation and also that $s_1 = s_2 = s$, the percentage short-circuit voltages of the primary windings indicated in Fig. 1 as $u_1$, $v_1$, $w_1$, respectively, and the percentage short-circuit voltages of the primary windings indicated in Fig. 1 as $u_2$, $v_2$, $w_2$ are equal. Hence, $$u_{s,1} \text{ percent} = u_{s,2} \text{ percent} = c\frac{(Iw)^2}{N_w}sD$$

For the percentage short-circuit voltage of the primary windings consisting of the series-connected windings $u_3'$, $u_3''$, $v_3'$, $v_3''$, $w_3'$, $w_3''$, respectively, the following formula is valid:

$$u_{s,3} \text{ percent} = u_{s,3'} \text{ percent} + u_{s,3''} \text{ percent}$$
$$= c\frac{[(1-x)Iw]^2}{N_w}s_{3'}D_{3'} + c\frac{(xIw)^2}{N_w}s_{3''}D_{3''}$$

whereby, in accordance with this invention, $x$ is greater than 0 but smaller than 0.5.

The equation for the condition of equal load distribution load $$u_{s,1} \text{ percent} = u_{s,2} \text{ percent} = u_{s,3} \text{ percent}$$

therefore can be written as $$sD = (1-x)^2s_3'D_3' + x^2s_3''D_3''$$

This equation may be satisfied by suitably choosing the load components for the windings $u_3'$, $u_3''$, $v_3'$, $v_3''$, $w_3'$, $w_3''$, respectively. Hence this invention teaches how equal load distribution may be obtained, without splitting up the high voltage winding or designing the leakage gap greater than it is required by electrical reasons.

According to the invention, the third windings on each transformer, i.e., the pairs $u_3'$ and $u_3''$, $v_3'$ and $v_3''$, and $w_3'$ and $w_3''$ are dimensioned to meet the equation for equal load distribution between the three primary windings. Obviously, the load distribution between the primary windings $u_1$ and $u_2$ for the first transformer, $v_1$ and $v_2$ for the second transformer and $w_1$ and $w_3$ for the third transformer are equal, since the geometrical arrangement of these primary windings is substantially the same. It is the third winding, which is divided into two sections and wound outside the secondary windings on the two legs, which presents the problem. By dividing this winding into unequal series-connected sections, the problem has been solved and the gaps between the two sections of this winding and the secondary windings need not be made excessively wide. It is the contribution of this invention to so unevenly divide the third primary winding into two sections that the short-circuit voltage of this third primary winding equals that of the other two primary windings.

The last equation contains instructions as to how the third primary winding should be divided into two third primary winding sections. In words, this equation states: the product of the mean diameter and the reduced width of the leakage gap between the primary windings close to the core and the secondary winding must equal the sum of the same product for the leakage gap between the first section of the third primary winding times the square of the power fraction for which this first section is dimensioned plus the same product leakage gap between the second section of the third primary winding times the square of the power fraction for which this second section is dimensioned. Further, the two sections of the third primary winding combined are dimensioned for a full phase power.

The unequal load distribution on the series-connected windings $u_3'$, $u_3''$, $v_3'$, $v_3''$, $w_3'$, $w_3''$, respectively, results in an unequal loading of the parallel high-voltage windings $U_1$, $U_2$, $V_1$, $V_2$, $W_1$, $W_2$. The cross-sectional area of the high voltage winding conductors, therefore, may be chosen so that equal current density obtains in the parallel branches, i.e. so that the cross sectional areas of the conductors of parallel connected windings are proportional to the load components.

I claim as my invention:

1. In a bank of three single-phase transformers supplied by three three-phase generators, a two-legged transformer, two first primary windings, one of said first primary windings on each of said legs, each of said first primary windings being dimensioned for full phase power, two second primary windings, one of said second primary windings on each of said legs, said two second primary windings being dimensioned for substantially different fractions of one phase power, the sum of these fractions equalling unity, said two second primary windings being series connected, and two secondary windings, one of said secondary windings on each of said legs, each of said secondary windings being dimensioned for the sum of the powers of said primary windings on said same leg, each of said two secondary windings being positioned between said first and said second primary winding on said leg, said secondary windings on said two legs being connected in parallel.

2. A two-legged transformer as claimed in claim 1, in which the percentage short-circuit voltage is approximately the same for all primary windings.

3. A bank of three single-phase transformers as claimed in claim 1, in which each of said first primary windings and said secondary winding on said same leg therewith defines a first leakage gap therebetween, one of said second primary windings and said secondary winding on said same leg therewith defines a second leakage gap therebetween, the other of said second primary windings and said secondary winding on the same leg therewith defines a third leakage gap, all four leakage gaps being substantially equal, and the product of the mean diameter and the reduced width of the first leakage gap is substantially equal to the sum of the same product for the second leakage gap times the square of the power fraction for which the associated second primary winding is dimensioned plus the same product for the third leakage gap times the square of the power fraction for which the associated second primary winding is dimensioned.

References Cited in the file of this patent

UNITED STATES PATENTS

| | | |
|---|---|---|
| 1,916,925 | Gay | July 4, 1933 |
| 2,780,735 | Minnici | Feb. 5, 1957 |